United States Patent [19]

Onuma

[11] Patent Number: 5,796,178
[45] Date of Patent: Aug. 18, 1998

[54] ANTI-THEFT APPARATUS FOR A VEHICLE

[75] Inventor: Yoshiki Onuma, Kanagawa-ken, Japan

[73] Assignee: Nissan Motor Co., Ltd., Yokohama, Japan

[21] Appl. No.: 807,779

[22] Filed: Feb. 28, 1997

[30] Foreign Application Priority Data

Mar. 1, 1996 [JP] Japan .................. 8-45043

[51] Int. Cl.$^6$ .................. G08G 1/123
[52] U.S. Cl. .................. 307/10.2; 307/10.3; 240/426; 240/825.69; 240/825.72; 180/287; 701/1; 701/2; 701/36
[58] Field of Search .................. 307/10.2–10.6; 340/425.5, 426, 430, 825.31, 825.34, 825.44, 825.36, 825.54, 825.69, 825.72; 123/198 B, 198 DB, 198 DC; 361/171, 172; 180/287; 70/256, 257; 364/423.098, 423.099, 424.027, 424.034, 424.037, 424.045, 424.059

[56] References Cited

U.S. PATENT DOCUMENTS 5,515,043 5/1996 Berard et al. .................. 340/426
5,515,285 5/1996 Garrett et al. .................. 340/426
5,557,254 9/1996 Johnson et al. .................. 340/426
5,640,139 6/1997 Egeberg .................. 340/426

FOREIGN PATENT DOCUMENTS 404146853 5/1992 Japan .................. 307/10.2
7-180410 7/1995 Japan .

Primary Examiner—William M. Shoop, Jr.
Assistant Examiner—Peter Ganjian
Attorney, Agent, or Firm—Foley & Lardner

[57] ABSTRACT

An anti-theft device memorizes the location of the vehicle when the engine stops, receives a signal peculiar to a vehicle (for example, from a key having a transmitter), and permits starting the engine when the received signal is identical with a predetermined code and the memorized location and the current location where the vehicle exists are within a predetermined range.

14 Claims, 4 Drawing Sheets

ANTI-THEFT APPARATUS FOR A VEHICLE

The contents of Application No. TOKUGANHEI 8-45043, with a filing date of Mar. 1, 1996, in Japan are hereby incorporated by reference.

BACKGROUND OF THE INVENTION

1. Field of the Invention

This invention relates to an anti-theft apparatus for a vehicle which permits an authorized driver to start the engine of the vehicle.

2. Related Art of the Invention

An anti-theft apparatus disposed on a vehicle, a so called immobilizer, with which only the authorized driver can start the engine is known (see TOKUKAIHEI 7-180410).

FIG. 5 shows a conventional immobilizer. A key cylinder 112 is placed near the steering wheel (not shown), with a key 110 inserted into to start the engine 120. A transponder 111 disposed in the key 110 transmits an ID signal peculiar to the key 110. An antenna 103 placed close to the key cylinder 112 receives the ID signal. The antenna 103 is connected to an immobilizer control unit (hereinafter referred to as IMMCU) 101, and the IMMCU 101 is connected to an engine control module (hereinafter referred to as ECM) 102 by a communication line 104. The ECM 102 controls the engine 120, and also has an ID code. The IMMCU 101 is connected to the ignition switch 105, which is closed when the key 110 is positioned to the "ON" position of the key cylinder.

When the key 110 is inserted into the key cylinder 112 and operated in order to start the engine 120, the ignition switch 105 is turned on, and the IMMCU 101 starts functioning. The IMMCU 101 generates a trigger on the antenna 103 and inquires the ID signal transmitted from the transponder 111 and received by the antenna 103. If the key ID signal is identical with the memorized authorized code, the IMMCU 101 starts to communicate with the ECM 102 through the communication line 104 and inquires the ID code of the ECM 102, which was established on the latest engine stop. If the ID code memorized by the ECM 102 is identical with the code memorized by the IMMCU 101, the IMMCU 101 transmits the signal to permit starting the engine 120 to the ECM 102. Receiving the signal, the ECM 102 enables starting the engine, and the engine 120 starts.

Meanwhile, if the ID signal transmitted by the transponder 111 is found unauthorized or if the ID codes memorized by the IMMCU 101 and by the ECM 102 are not identical with each other, the IMMCU 101 does not transmit the signal to permit starting the engine 120.

Therefore, without the authorized key the engine 120 cannot be started, and the vehicle cannot be driven by an unauthorized driver.

The immobilizer mentioned-above, however, could not be effective to avoid the theft by towing or carrying the victim's vehicle per se.

Moreover, theft by changing the immobilizer control unit and the engine control unit to other units originally disposed in another car cannot be avoided.

SUMMARY OF THE INVENTION

Accordingly, it is a general object of the invention to provide an anti-theft apparatus which will obviate or minimize difficulties of the type previously described.

It is a specific object of the invention to provide a more effective anti-theft apparatus against the theft by towing or carrying the vehicle.

It is another object of the invention to provide a more effective anti-theft apparatus to avoid the theft by changing the immobilizer control units.

A preferred embodiment of the invention includes a detector to detect the location of the vehicle, and a memory to memorize the location of the vehicle where the engine stops. A controller permits starting the engine when the memorized location and the location where the vehicle exists are within a predetermined range.

Accordingly, if the vehicle is moved by an unauthorized expedient, i.e., towed or carried, then the memorized location and the location where the vehicle exists are out of the range, and the engine cannot be started. This discourages the thief from moving the vehicle, and the anti-theft apparatus works effectively.

Another preferred embodiment of the invention includes a housing for containing both the memory and the controller. According to this structure, when the controllers are changed, the memories are also changed. Therefore, the memorized location and the location where the vehicle exists differ from each other, and the engine cannot be started. Accordingly, the theft caused by changing the controllers is avoided.

Still another preferred embodiment of the invention further includes a transmitter to transmit a signal peculiar to a vehicle, and the controller permits starting the engine when the signal from the transmitter is identical with a predetermined code and when the memorized location and the location where the vehicle exists are within a predetermined range.

Yet another preferred embodiment of the invention further includes an engine controller and a pair of code memories each disposed on the engine controller and the controller. The controller permits starting the engine, when the signal from the transmitter is identical with a predetermined code, when the memorized location and the location where the key is operated in order to start the engine are within a predetermined range, and when the codes memorized by both code memories are identical with each other.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
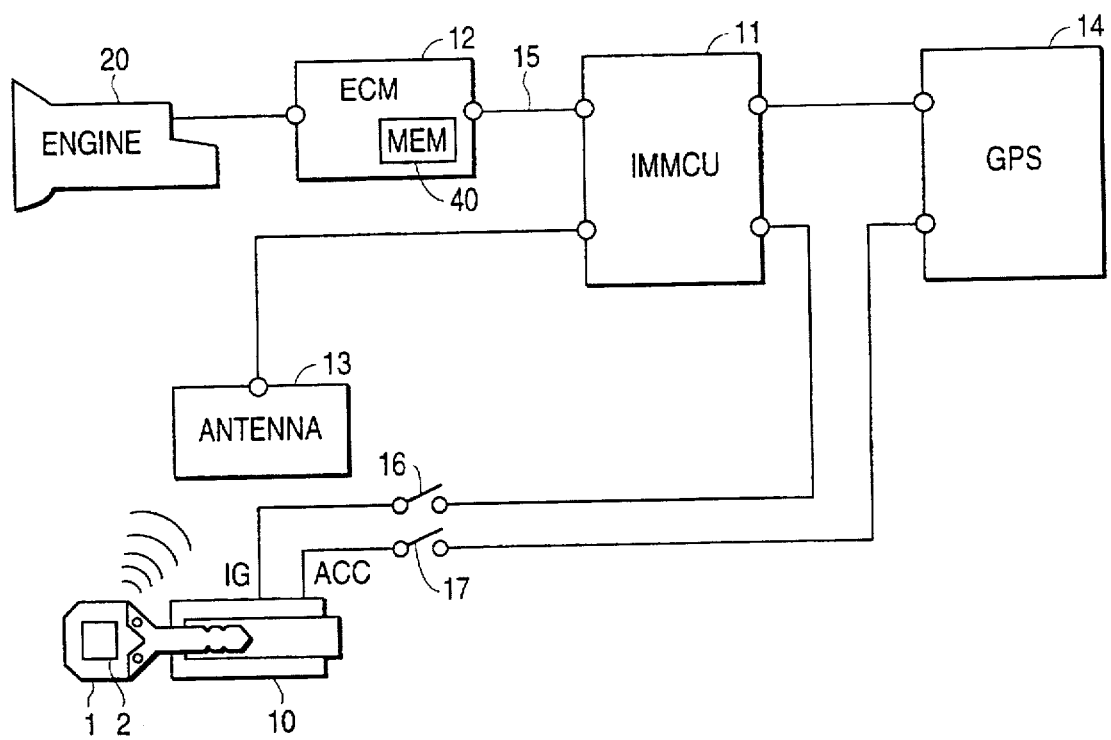
FIG. 1 is a block diagram of an anti-theft apparatus according to a preferred embodiment of the present invention.

Referring now to the drawings, wherein like numerals indicate like parts, and initially to FIG. 1, there will be seen a key cylinder 10 into which a key 1 is inserted in order to drive the vehicle. A transponder 2 disposed in the key 1 transmits a key ID signal peculiar to the key 1 responding to a trigger generated by an antenna 13. The antenna 13 placed close to the key cylinder 10 receives the key ID signal.

Figure 2:
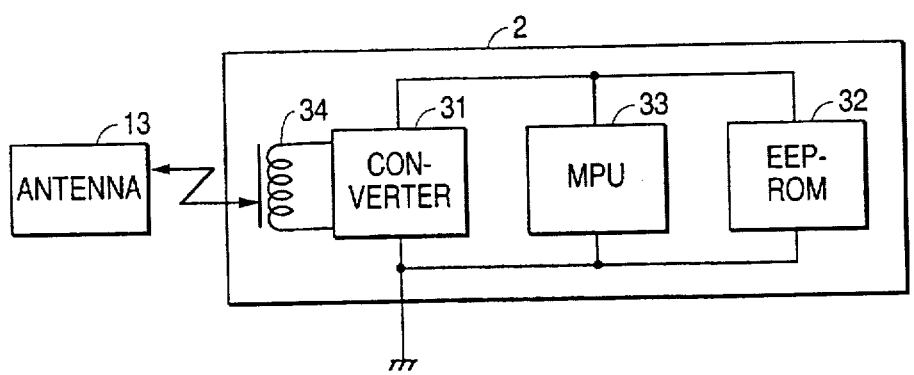
FIG. 2 is a block diagram of a transponder according to the preferred embodiment of the present invention.

In more detail, illustrated in FIG. 2, the transponder 2 comprises a key antenna 34, converter 31, MPU (micro processing unit) 33, and EEPROM 32. The trigger generated by the antenna 13 is received by the key antenna 34, and converted to current by the converter 31. The converter 31 includes a capacitor, the current is temporarily charged in the capacitor, and discharged to energize the MPU 33 and EEPROM 32. The energized MPU 33 retrieves the ID signal memorized in the EEPROM 32, and transmits the ID signal through the converter 31 and the key antenna 34.

Instead of the transponder 2, a transmitter which transmits the ID signal corresponding to the operation of a switch disposed on the key 1 can be used.

Referring to the FIG. 1 again, the antenna 13 is connected to an immobilizer control unit (hereinafter referred to as IMMCU) 11, and the IMMCU 11 is connected to the ignition switch 16, which is closed when the key 1 is positioned at the "ON" position.

The IMMCU 11 is connected to an engine control module (hereinafter referred to as ECM) 12 by a communication line 15. The ECM 12 controls the engine 20: controlling the ACC valve (controlling the idling) angle, amount of the fuel injection, timing of igniting the spark plug, etc., corresponding to the signals from an O2 sensor, a knock sensor, a coolant temperature sensor, air flow sensor, and an engine revolution sensor, etc. The ECM 12 has memory 40 to store a rolling code. The rolling code is used by the IMMCU 11 and the ECM 12 to identify each other as the authorized units. The IMMCU 11 and ECM 12 establish a rolling code every time when the engine 20 is stopped and memorize it respectively. Afterward, the rolling codes are inquired to determine whether both the rolling codes memorized by the IMMCU 11 and memory 40 of the ECM 12 agree with each other.

The IMMCU 11 is also connected to a global positioning system (hereinafter referred to as GPS) 14. The GPS 14, as it is well-known, receives radio waves from several satellites and calculates its own location on the earth. The data on the location calculated by the GPS 14 is sent to the IMMCU 11. The GPS 14 is activated when the accessory switch 17 is closed and the key 1 is positioned at "ACCESSORY" or "ON" position. Therefore, the GPS 14 works when the key 1 is positioned at "ACCESSORY" or "ON" position.

A GPS is usually installed in a car navigation system, and the anti-theft apparatus of the invention can share that GPS. Otherwise, the GPS 14 can be installed for exclusive use as the part of the anti-theft apparatus of the invention.

The IMMCU 11 retrieves the location data of the vehicle from the GPS 14, establishes the rolling code with the ECM 12, and memorizes the location data and the rolling code, when the key 1 is operated to stop the engine.

The IMMCU 11 retrieves the location data from the GPS 14 again, when the key 1 is operated to start the engine 20, and compares the current location of the vehicle and the memorized location data. If the both locations are the same or close to each other, it is found the vehicle has not been moved wickedly during its parking.

Additionally, the IMMCU 11 receives the key ID signal transmitted by the transponder 2 contained in the key 1. The IMMCU 11 inquires whether the key ID signal is authorized.

The IMMCU 11 communicates with the ECM 12 when the key ID signal is found authorized, and inquires the rolling codes memorized by the IMMCU 11 and the ECM 12, which were established at the latest operation of the key 1 to stop the engine 20. The IMMCU 11 sends the command signal to permit starting the engine 20 to the ECM 12, if both rolling codes are identical with each other.

Therefore, the ECM 12 starts the engine when the current and the memorized locations of the vehicle are close, when the key ID signal is authorized, and when the rolling codes are identical.

Figure 3:
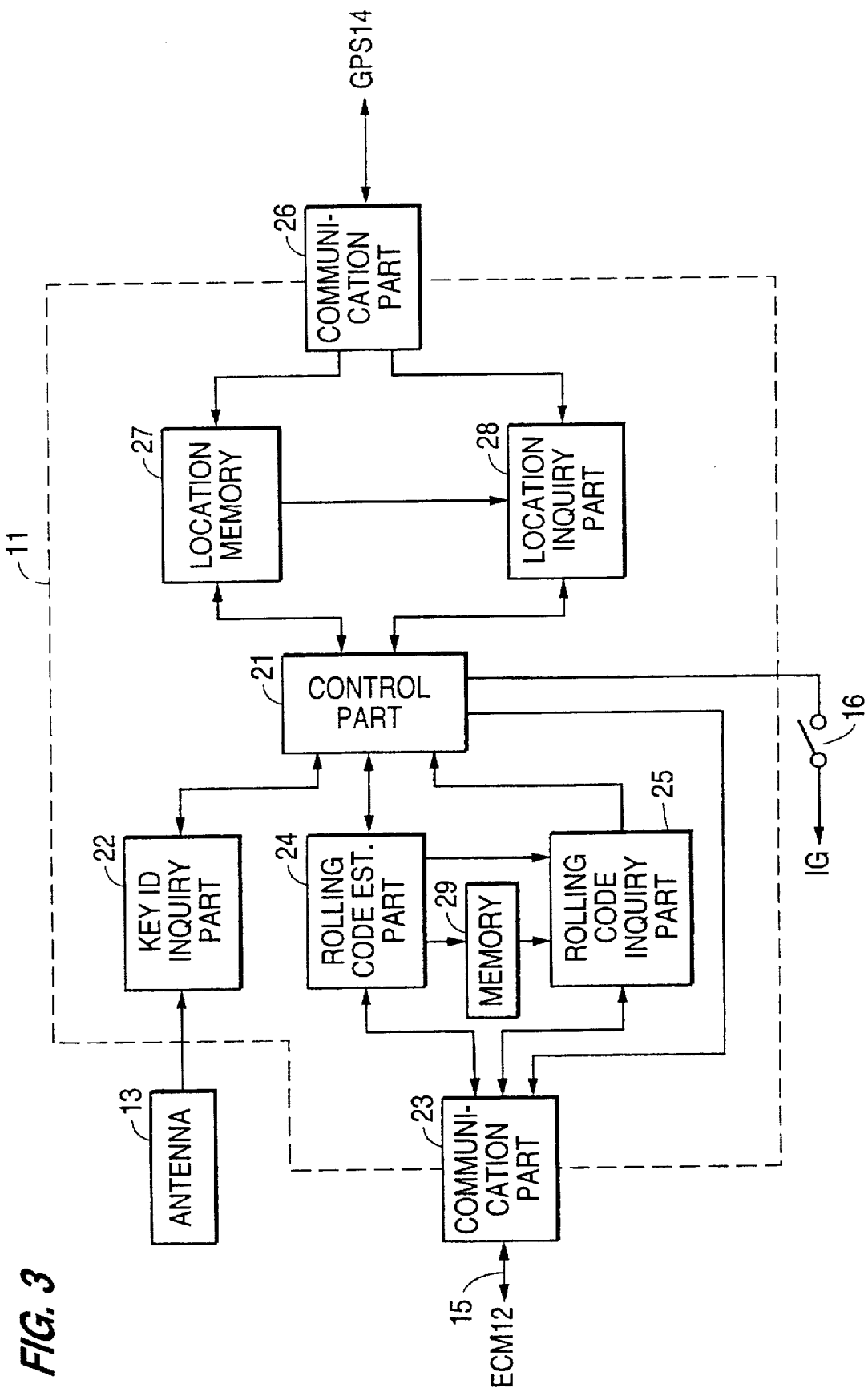
FIG. 3 is a detailed block diagram of an immobilizer control unit according to the preferred embodiment of the present invention.

FIG. 3 illustrates the detailed block diagram of the IMMCU 11 representing the functions.

The control part 21 controls general function. The key ID inquiry part 22 is storing the key ID code or codes (for example, 1 to 4 codes) peculiar to the authorized key or keys, and inquires whether the ID signal of the key 1 received by the antenna 13 is identical with a memorized key ID code.

The communication part 23 transmits and receives various data to and from the ECM 12 through the communication line 15. The rolling code establishing part 24 communicates with the ECM 12 through the communication part 23, establishes a rolling code, and stores it in the memory 29, when the key 1 is operated to stop the engine. This ID code is also sent to the ECM 12 and memorized by the memory 40 in the ECM 12.

The rolling code is established as follows.

When the control part 21 detects the condition that the ignition switch 16 is turned off, the control part 21 sends a signal to the rolling code establishing part 24. The memory 29 stores several codes, and the rolling code establishing part 24 chooses one of the codes in memory 29 in random order. Next, the rolling code establishing part 24 sends the chosen code to the ECM 12 and stores it temporarily in the memory 29. The ECM 12 stores the new code into the memory 40 and sends it back to the rolling code establishing part 24. The rolling code establishing part 24 compare the sent-back code and the temporarily stored code. If both codes are the same, then the rolling code establishing part 24 renews the rolling code in the memory 29.

The rolling code may, also, be established and memorized during the production of IMMCU and ECM, and held eternally, like the key ID signal.

The rolling code inquiry part 25 inquires whether the rolling codes memorized by the ECM 12 and by the memory 29 are identical.

The communication part 26 receives the location data of the vehicle from the GPS 14. The location memory 27 memorizes the location data of the vehicle when the ignition switch 16 is turned off.

The location memory 27 is located so that the IMMCU 11 and the location memory 27 are carried together: i.e., for example, the location memory has addresses in the RAM to operate the control part 21 (not shown); the location memory 27 (as a form of a RAM chip, for example) is disposed on the same board as the control part 21 (as a form of a CPU, for example) is disposed on; the control part 21 and the location memory 27 are contained in the same housing; a housing containing the control part 21 and another housing containing the location memory are fixed together; and so on. Accordingly, when the thief changes the IMMCU 11, the memorized location is changed to another location.

The location inquiring part 28 obtains the location data both from the GPS 14 and the location memory 27 when the ignition switch 16 is turned on, and inquires whether both location data show that the locations are the same or close to each other.

If the key ID signal, the rolling codes, and the location data are identical, then the control part 21 transmits the command signal to permit starting the engine 20 through the communication part 23 to the ECM 12.

Figure 4:
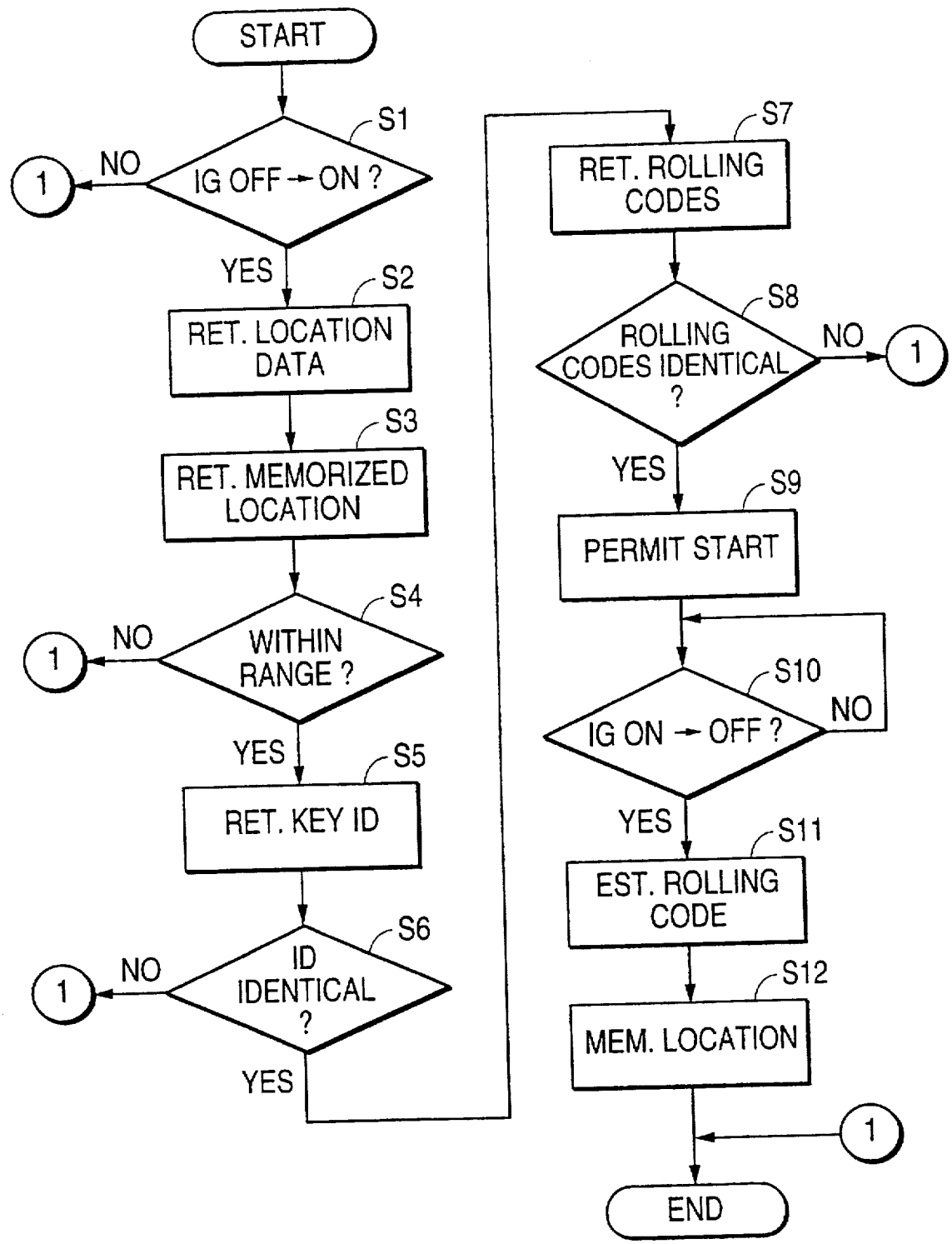
FIG. 4 is a flow chart for controlling the immobilizer control unit according to the preferred embodiment of the present invention.
Figure 5:
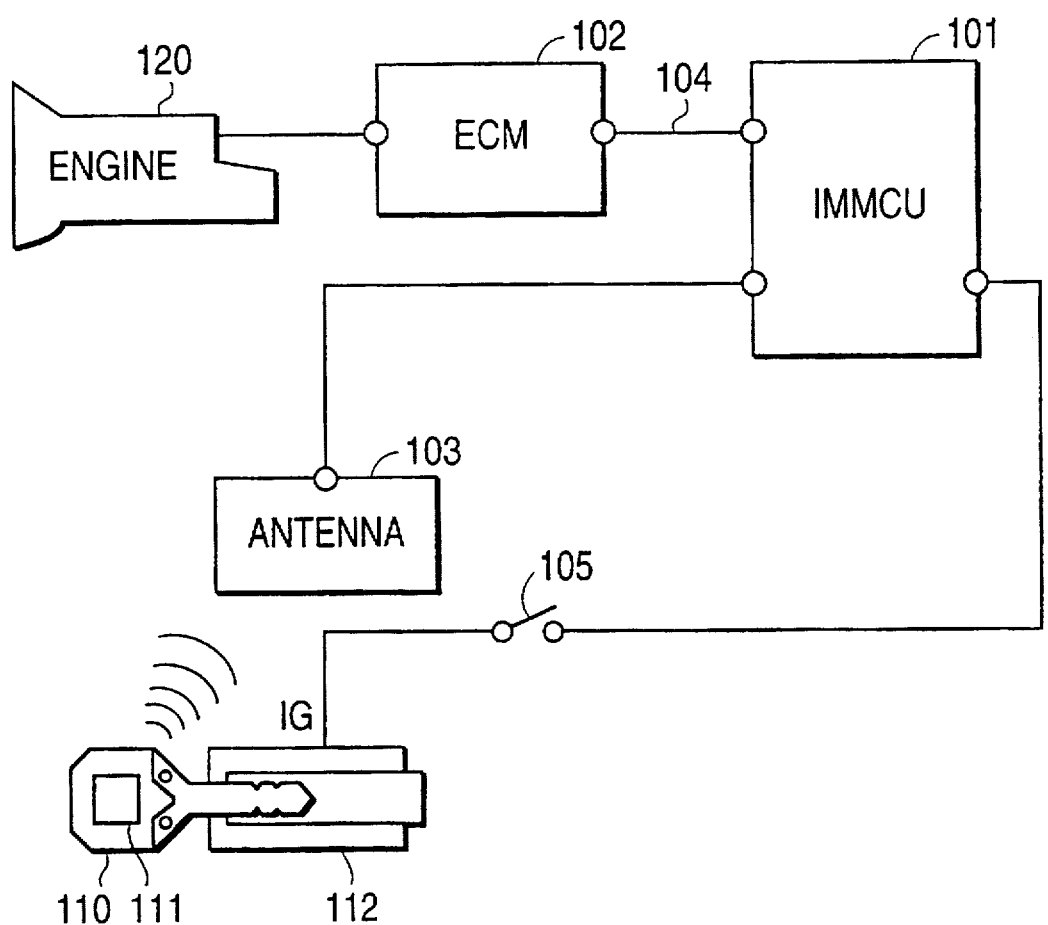
FIG. 5 is a block diagram of an anti-theft apparatus according to the conventional art.

FIG. 4 shows the flow chart of the process that the IMMCU 11 permits starting the engine 20. Inserting the key 1 into the key cylinder 10 and operating the key 1 to start the engine 20 turns on the accessory switch 17 and the ignition switch 16 in order. Step S1 is repeated until the ignition switch 16 is turned on.

At step S2 the current location of the vehicle is retrieved according to the data of the GPS 14. At step S3 the location data which was memorized when the key 1 was operated to stop the engine 20 at the last time is retrieved.

At step S4, it is inquired whether the location data retrieved at both steps S2 and S3 are within a predetermined range of distance. If they are within the predetermined range ("YES" is obtained), then the next step S5 is provided, since it is regarded that the vehicle has not been moved during its parking. If the location data do not show that the locations are close at step S4 ("NO" is obtained), then the program is ended ("END" is provided), since it is regarded that the car has been moved or IMMCU 11 was replaced with another one, i.e. the vehicle has been/is being stolen. Therefore, the engine can not be started in this situation.

The predetermined range of distance for the inquiry at step S5 depends on the measuring accuracy of the GPS 14, etc.: the range less than 10 meters, 100 meters, or hundreds meters, for instance, can be adopted.

At step S5, the key ID signal received by the antenna 13 is retrieved. At next step S6, the key ID signal retrieved at step S5 and the key ID code registered in the IMMCU 11 (the key ID inquiry part 22) are compared. If they are identical ("YES" is obtained), then the next step S7 is provided. If they are not identical ("NO" is obtained), then the program is ended ("END" is provided), therefore an unauthorized key is useless.

At step S7 the rolling codes memorized by both ECM 12 (the memory 40) and IMMCU 11 (the memory 29) are retrieved. At next step S8, the rolling codes are compared with each other. If they are identical ("YES" is obtained), then the next step S9 is provided. If they are not identical ("NO" is obtained), then the program is ended ("END" is provided), therefore the criminal changing the IMMCU is not enabled to start the engine 20.

At step S9, the command signal to permit starting the engine 20 is transmitted to the ECM 12 through the communication part 23. Accordingly, ECM 12 enables starting the engine 20, and the engine 20 is started corresponding to the operation of the key 1.

After starting the engine 21 and driving the vehicle, the authorized driver parks, when the driver operates the key 1 in order to stop the engine. This key operation turns off the ignition switch 16 (as well as the accessory switch 17), which is detected at step S10. If an off ignition switch 16 is detected at step S10, then step S11 provides establishing the new rolling code preparing for the next engine start. At next step S12, the location data obtained by the GPS 14 is restored into the location memory 27.

In the embodiment mentioned-above, the transponder 2, the GPS 14, the ECM 12, and the location memory 27 respectively correspond to the transmitter, detector, the engine controller and the memory in the claim. The control part 21, location inquiry part 28, key ID inquiry part 22, and the rolling code establishing part 24 compose the controller in the claim.

After reading and understanding the foregoing inventive anti-theft apparatus, in conjunction with the drawings, it will be appreciated that several distinct advantages of the subject invention are obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An anti-theft apparatus for a vehicle having an engine therein, comprising:

a detector to detect the location of said vehicle;

a memory to memorize the location of said vehicle where the engine of said vehicle stops; and a controller to permit starting said engine when said location memorized by said memory and the location where said vehicle exists are within a predetermined range and to inhibit starting said engine when said location memorized by said memory and the location where said vehicle exists are not within said predetermined range.

2. The anti-theft apparatus as defined in claim 1, further comprising:

a transmitter to transmit a signal peculiar to a vehicle; wherein said controller permits starting said engine when said signal from said transmitter is identical with a predetermined code and said location memorized by said memory and the location where said vehicle exists are within a predetermined range.

3. The anti-theft apparatus as defined in claim 2, further comprising:

a key being operated in order to start and to stop said engine of said vehicle; wherein said transmitter is disposed on said key to transmit a signal peculiar to said key;

said memory memorizes the location of said vehicle where said key is operated in order to stop said engine; and said controller permits starting said engine when said signal from said transmitter is identical with a predetermined code and said location memorized by said memory and the location where said key is operated in order to start said engine are within a predetermined range.

4. The anti-theft apparatus as defined in claim 1, further comprising:

a housing for containing said memory and said controller together therein.

5. The anti-theft apparatus as defined in claim 1, wherein:

said memory is composed of a memory chip disposed on a board; and said controller is composed of a micro computer chip, said micro computer chip is disposed on a same board as said memory chip is disposed thereon.

6. The anti-theft apparatus as defined in claim 1, wherein:

said controller is composed of a micro computer chip and a memory chip; and said memory is disposed in said memory chip.

7. The anti-theft apparatus as defined in claim 1, wherein:

said detector comprises a global positioning system.

8. The anti-theft apparatus as defined in claim 1, further comprising:

a key being operated in order to start and to stop said engine of said vehicle; wherein said memory memorizes the location of said vehicle where said key is operated in order to stop said engine; and said controller permits starting said engine again when said location memorized by said memory and the location where said key is operated in order to start said engine are within said predetermined range.

9. The anti-theft apparatus as defined in claim 2, further comprising:

an engine controller to control said engine;

a pair of code memories one disposed on said engine controller and one disposed on said controller to memorize a code of said engine controller; and wherein said controller permits starting said engine when said signal from said transmitter is identical with a predetermined code, when said location memorized by said memory and the location where said vehicle exists are within said predetermined range, and when said codes memorized by both code memories are identical with each other.

10. The anti-theft apparatus as defined in claim 9, further comprising:

a code establisher to establish said code when said engine of said vehicle stops, said code establisher sending said code to said pair of code memories so that said established code is memorized by said code memories.

11. A method for avoiding a theft of a vehicle, comprising the steps of:

detecting the location of said vehicle;

memorizing the location of said vehicle when an engine of said vehicle stops; and permitting starting said engine only when said location memorized is close to a current location of said vehicle.

12. The method for avoiding a theft as defined in claim 11, further comprising the steps of:

receiving a signal peculiar to a vehicle; and permitting starting said engine only when said received signal is identical with a predetermined code and said location memorized is close to the current location of said vehicle.

13. A vehicle with an anti-theft apparatus, said vehicle comprising:

detecting means for detecting the location of said vehicle;

memory means for memorizing the location of said vehicle where an engine of said vehicle stops; and controlling means for permitting energization of said engine when said location memorized by said memory means and a current location of said vehicle are within a predetermined range and for inhibiting energization of said engine when said location memorized by said memory means and said current location of said vehicle are not within said predetermined range.

14. The vehicle with an anti-theft apparatus as defined in claim 13, further comprising:

transmitting means for transmitting a signal peculiar to said vehicle; wherein said controlling means permits energizing said engine when said signal from said transmitting means is identical with a predetermined code and said location memorized by said memory means and a current location of said vehicle are within a predetermined range.

* * * * *